US010782407B2

(12) United States Patent
Sugae et al.

(10) Patent No.: US 10,782,407 B2
(45) Date of Patent: Sep. 22, 2020

(54) OBJECT DETECTION DEVICE AND PARKING ASSISTANCE APPARATUS

(71) Applicant: AISIN SEIKI KABUSHIKI KAISHA, Kariya-shi, Aichi-ken (JP)

(72) Inventors: Ippei Sugae, Chita-gun (JP); Hisashi Inaba, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 16/405,437

(22) Filed: May 7, 2019

(65) Prior Publication Data

US 2019/0346563 A1 Nov. 14, 2019

(30) Foreign Application Priority Data

May 11, 2018 (JP) .................................. 2018-092052
Dec. 21, 2018 (JP) .................................. 2018-240295

(51) Int. Cl.
*G01S 15/04* (2006.01)
*G01S 15/931* (2020.01)
*G01V 1/28* (2006.01)
*G01V 1/34* (2006.01)

(52) U.S. Cl.
CPC ............ *G01S 15/04* (2013.01); *G01S 15/931* (2013.01); *G01S 2015/932* (2013.01)

(58) Field of Classification Search
CPC .................................................... G01S 13/34
See application file for complete search history.

(56) References Cited

U.S. PATENT DOCUMENTS

| 7,496,157 B2 | 2/2009 | Katou et al. | |
|---|---|---|---|
| 2005/0135190 A1* | 6/2005 | Katou | G01S 7/5273 367/99 |
| 2015/0016224 A1* | 1/2015 | Houshuyama | G01S 7/536 367/93 |
| 2017/0227640 A1* | 8/2017 | Nomura | B60R 21/00 |
| 2018/0021814 A1 | 1/2018 | Watanabe et al. | |
| 2019/0079187 A1* | 3/2019 | Tsuji | G01S 15/93 |

FOREIGN PATENT DOCUMENTS

JP 4283170 B2 6/2009
WO 2016/167003 A1 10/2016

* cited by examiner

*Primary Examiner* — Joseph H Feild
*Assistant Examiner* — Pameshanand Mahase
(74) *Attorney, Agent, or Firm* — Sughrue Mion, PLLC

(57) ABSTRACT

An object detection device includes: a transducer having a vibrator transmitting and receiving an ultrasonic wave and configured to transmit a transmission signal encoded to be imparted with identification information and receive the transmission signal reflected by an object as a reception signal; a correlation processing unit acquiring a first correlation value corresponding to a degree of similarity between the identification information of the transmission and reception signals and to determine whether the reception signal to which the identification information having a predetermined level or higher degree of similarity with the identification information of the transmission signal is imparted has been received; and a detection unit detecting information about the object when determined that the reception signal to which the identification information having the predetermined level or higher degree of similarity is imparted has been received.

15 Claims, 5 Drawing Sheets

OBJECT DETECTION DEVICE AND PARKING ASSISTANCE APPARATUS

CROSS REFERENCE TO RELATED APPLICATIONS

This application is based on and claims priority under 35 U.S.C. § 119 to Japanese Patent Applications 2018-092052 and 2018-240295, filed on May 11, 2018 and Dec. 21, 2018, respectively, the entire contents of which are incorporated herein by reference.

TECHNICAL FIELD

This disclosure relates to an object detection device and a parking assistance apparatus.

BACKGROUND DISCUSSION

In the related art, a technology has been known, which acquires information about an object such as the distance to the object by transmitting a transmission signal as ultrasonic waves via a vibrator such as a piezoelectric element and receiving the transmission signal reflected by the object as a reception signal via the vibrator to acquire a difference in timing between the transmission and reception of ultrasonic waves. See, for example, WO 2016/167003 (Reference 1).

In the above technology using the vibrator, since the vibrator continues to vibrate due to inertia even after the transmission of the transmission signal is completed, it takes time until the vibration of the vibrator subsides. Such time is called "reverberation time." Here, when the reception signal is received during the reverberation time, the vibration of the vibrator generated by the reception signal and the residual vibration of the vibrator due to inertia coexist. In this case, since it is difficult to accurately detect only the reception signal due to, for example, a fixed threshold value concerning the amplitude of vibration, conventionally, detection of the reception signal has been avoided until the reverberation time is over.

However, in a situation where an object as a detection target exists very close, for example, in a case where a difference between a vehicle width and a parking frame (e.g., the wall) is very small, it is also conceivable that the transmission signal is returned before the reverberation time is over. Thus, there is a demand for a technology of detecting a reception signal even before the reverberation time is over to realize detection of an object existing at a shorter distance.

Thus, a need exists for an object detection device and a parking assistance apparatus which are not susceptible to the drawback mentioned above.

SUMMARY

An object detection device according to an aspect of this disclosure includes a transducer having a vibrator capable of transmitting and receiving an ultrasonic wave and configured to transmit a transmission signal on which encoding has been performed to impart identification information of a predetermined code length and receive the transmission signal reflected by an object existing on a periphery as a reception signal by the vibrator, a correlation processing unit configured to acquire a first correlation value corresponding to a degree of similarity between the identification information of the transmission signal and the identification information of the reception signal from immediately after transmission of the transmission signal is completed and to determine, based on a result of comparison between the first correlation value and a first threshold value, whether or not the reception signal to which the identification information having a predetermined level or higher degree of similarity with the identification information of the transmission signal is imparted has been received, and a detection unit configured to detect information about the object when it is determined that the reception signal to which the identification information having the predetermined level or higher degree of similarity with the identification information of the transmission signal is imparted has been received.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the accompanying drawings. The configurations of the embodiments to be described below and the actions and results (effects) caused by the configurations are merely given by way of example and are not limited to the following description.

First Embodiment

Figure 1:
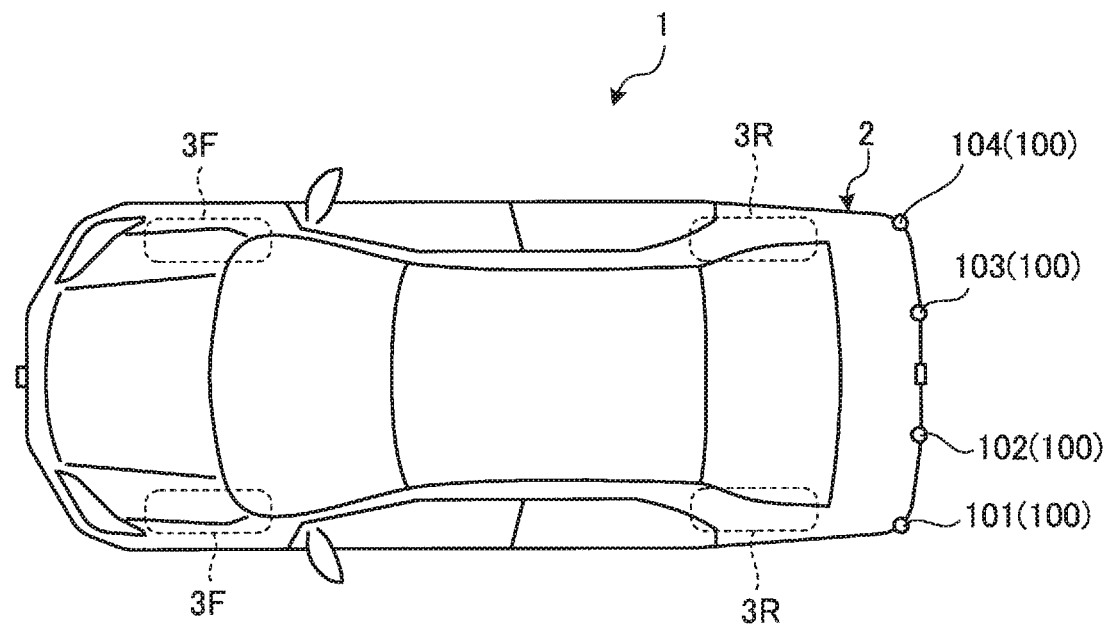
FIG. 1 is an exemplary and schematic diagram illustrating the appearance of a vehicle having object detection devices according to a first embodiment (and a second embodiment) as viewed from above.

FIG. 1 is an exemplary and schematic diagram illustrating the appearance of a vehicle 1 having object detection devices 101 to 104 according to a first embodiment (and a second embodiment to be described below) as viewed from above. Although will be described in detail below, the object detection devices 101 to 104 are sensing devices that detect information about an object including a person who exists on the periphery (e.g., an obstacle X1 illustrated in FIG. 2) by performing transmission and reception of ultrasonic waves to acquire, for example, a time difference between the transmission and the reception.

As illustrated in FIG. 1, the object detection devices 101 to 104 are mounted on a vehicle body 2 of a four-wheeled vehicle 1 including a pair of left and right front wheels 3F and a pair of left and right rear wheels 3R. More specifically, the object detection devices 101 to 104 are provided at different positions on the rear end of the vehicle body 2, for example, on a rear bumper.

In addition, in the first embodiment, the respective object detection devices 101 to 104 have the same hardware configuration and function. Thus, in the following description, for simplicity, the object detection devices 101 to 104 may be collectively referred to as the object detection device 100 in some cases.

Figure 2:
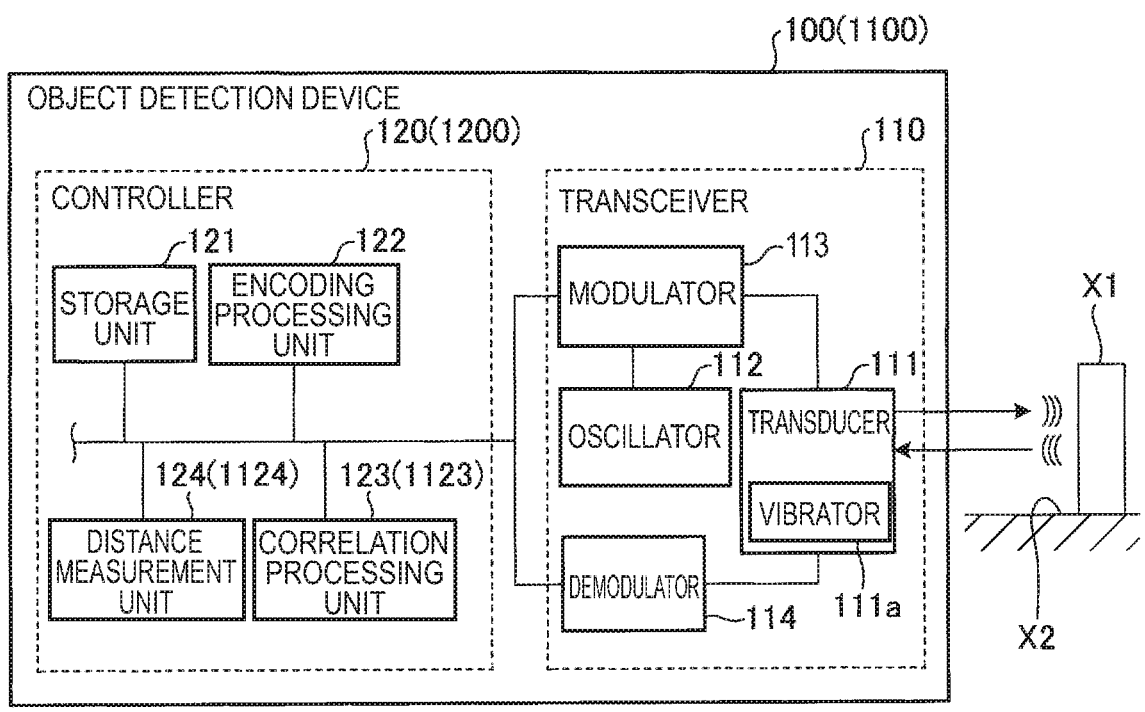
FIG. 2 is an exemplary and schematic diagram illustrating a configuration of the object detection device according to the first embodiment.

FIG. 2 is an exemplary and schematic diagram illustrating a configuration of the object detection device 100 according to the first embodiment. As illustrated in FIG. 2, the object detection device 100 includes a transceiver 110 and a controller 120.

The transceiver 110 includes a transducer 111. The transducer 111 includes a vibrator 111a such as a piezoelectric element and realizes the transmission and reception of ultrasonic waves by the vibrator 111a.

More specifically, the transducer 111 transmits ultrasonic waves generated according to the vibration of the vibrator 111a as a transmission signal and receives the vibration of the vibrator 111a caused when the ultrasonic waves transmitted as the transmission signal are reflected and returned from an object existing at the outside as a reception signal. In addition, in FIG. 2, the obstacle X1 provided on a road surface X2 is illustrated as the object that reflects the ultrasonic waves from the transducer 111.

Here, in the above technology using the vibrator 111a, since the vibrator 111a continues to vibrate due to inertia even after the transmission of the transmission signal is completed, it takes time (so-called reverberation time) until the vibration of the vibrator 111a subsides. Here, when the reception signal is received during the reverberation time, the vibration of the vibrator 111a generated by the reception signal and the residual vibration of the vibrator 111a due to inertia coexist. In this case, since it is difficult to accurately detect only the reception signal due to, for example, a fixed threshold value concerning the amplitude of vibration, conventionally, detection of the reception signal has been avoided until the reverberation time is over.

However, in a situation where an object as a detection target exists very close, for example, in a case where a difference between a vehicle width and a parking frame (e.g., a wall) is very small, it is also conceivable that the transmission signal is returned before the reverberation time is over. Thus, there is a demand for a technology of detecting the reception signal even before the reverberation time is over, thus realizing detection of an object existing at a shorter distance.

Therefore, in the first embodiment, the transceiver 110 and the controller 120 have the following hardware and functions to realize detection of the object existing at a shorter distance.

In the first embodiment, the transceiver 110 includes an oscillator 112, a modulator 113, and a demodulator 114 in addition to the transducer 111. These components are realized in, for example, hardware using an analog circuit.

The oscillator 112 oscillates a signal of a predetermined frequency for vibrating the vibrator 111a of the transducer 111 and outputs the oscillated signal to the modulator 113.

The modulator 113 modulates the signal input from the oscillator 112 based on a signal input from the controller 120 and outputs the modulated signal to the transducer 111 as a voltage signal for vibrating the vibrator 111a. In addition, in the first embodiment, as a modulation method, commonly known methods such as an amplitude modulation method, a phase modulation method, and a frequency modulation method may be used alone or in combination. In addition, in the first embodiment, the modulator 113 may be configured to perform appropriate switching between a plurality of modulation methods based on an instruction from the controller 120.

The demodulator 114 demodulates the signal input from the transducer 111 and outputs the demodulated signal to the controller 120. A demodulation method corresponding to the modulation method used by the modulator 113 is used.

The controller 120 includes a storage unit 121, an encoding processing unit 122, a correlation processing unit 123, and a distance measurement unit 124. For example, when the controller 120 is configured as a processing device having hardware similar to a usual computer such as a processor or a memory, these components are realized functionally (i.e., by cooperation of hardware and software) as a result of the processor reading and executing a program stored in the memory. In addition, in the first embodiment, each unit constituting the controller 120 may be realized in, for example, hardware by a dedicated analog circuit.

The storage unit 121 stores various data used by the controller 120 to realize the function thereof.

The encoding processing unit 122 performs encoding that imparts identification information of a predetermined code length to the transmission signal using modulation by the modulator 113. More specifically, the encoding processing unit 122 generates a bit string that is a sequence of 0 or 1 bits as identification information peculiar to the object detection device 100. The length of the bit string corresponds to the code length of the identification information imparted to the transmission signal. The encoding processing unit 122 outputs the generated bit string to the modulator 113 and causes the modulator 113 to perform modulation according to each bit of the bit string, thereby realizing encoding that imparts the identification information corresponding to the bit string to the transmission signal.

For example, in a case where an amplitude modulation method is used as a modulation method, when a bit string as identification information is input from the encoding processing unit 122, the modulator 113 changes the magnitude of the amplitude of a voltage signal to be output to the transducer 111 according to whether each bit of the bit string is 0 or 1. Similarly, in a case where a phase modulation method is used as a modulation method, the modulator 113 changes the phase of a voltage signal to be output to the transducer 111 according to whether each bit of the bit string input from the encoding processing unit 122 is 0 or 1, and in a case where a frequency modulation method is used as a modulation method, the modulator 113 changes the frequency of a voltage signal to be output to the transducer 111 according to whether each bit of the bit string input from the encoding processing unit 122 is 0 or 1.

The correlation processing unit 123 acquires a correlation value corresponding to the degree of similarity (coincidence) between the identification information of the transmission signal and the identification information of the reception signal, and determines whether or not the degree of similarity is a predetermined level or higher based on the result of comparison between the correlation value and a threshold value (first threshold value). The correlation value reaches a peak beyond the threshold value when the waveforms of the transmission signal and the reception signal are coincident with each other. Such a correlation value may be acquired (calculated) based on, for example, a generally well-known correlation function. The correlation processing unit 123 determines whether or not a bit string generated by the encoding processing unit 122 as identification information imparted to the transmission signal and a bit string as identification information specified from the reception signal demodulated by the demodulator 114 are similar to (coincident with) each other at a predetermined level or higher using the correlation value acquired based on a correlation function, for example, and based on the result of the determination, determines whether or not the reception signal demodulated by the demodulator 114 is the transmission signal reflected and returned by an object.

The distance measurement unit 124 is a detection unit that detects information about an object (e.g., the presence or absence of the object or the distance to the object) when it is determined that the degree of similarity is the predetermined level or higher. More specifically, the distance measurement unit 124 calculates the distance to the object as information about the object by a so-called Time of Flight (TOF) method based on a difference between the timing at which the transmission signal is transmitted (more specifically, starts to be transmitted) and the timing at which the reception signal is received (more specifically, starts to be received).

Here, in the first embodiment, as described above, identification information is imparted to the transmission signal, and it is determined whether or not the reception signal demodulated by the demodulator 114 is the transmission signal reflected and returned by the object based on the correlation value corresponding to the degree of similarity between the identification information of the transmission signal and the identification information of the reception signal. Since the identification information is not basically lost by reflection, it is possible, based on the identification information, to detect only the former from among the vibration of the vibrator 111a generated by the reception signal and the residual vibration of the vibrator 111a due to inertia even when the reception signal is received during the reverberation time.

Thus, in the first embodiment, the correlation processing unit 123 acquires the correlation value from immediately after the transmission of the transmission signal is completed and determines whether or not the degree of similarity between the identification information of the transmission signal and the identification information of the reception signal is a predetermined level or higher based on the result of comparison between the correlation value and the threshold value (first threshold value).

Figure 3:
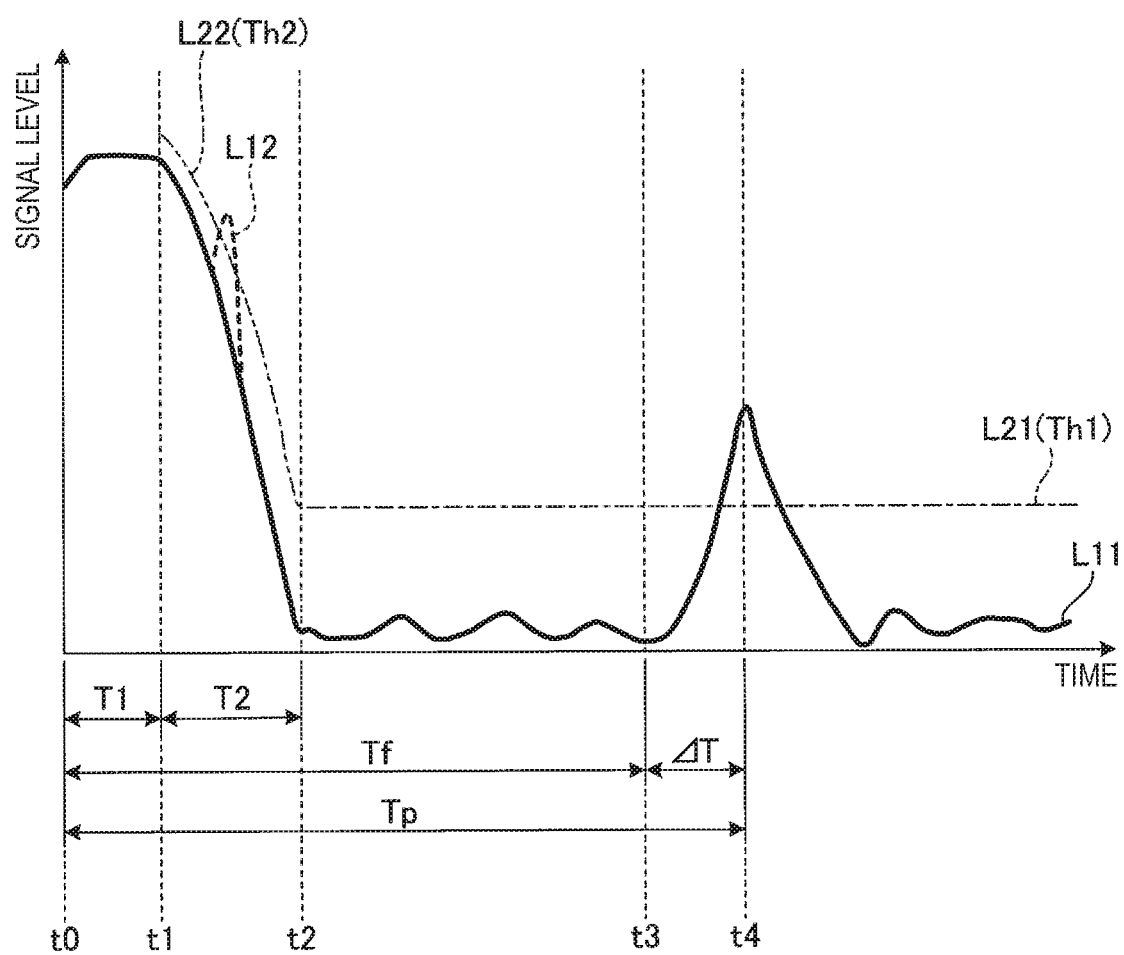
FIG. 3 is an exemplary and schematic graph illustrating an example of a waveform of a signal transmitted and received by the object detection device according to the first embodiment.

FIG. 3 is an exemplary and schematic graph illustrating an example of a waveform of a signal transmitted and received by the object detection device 100 according to the first embodiment. In the graph illustrated in FIG. 3, the horizontal axis corresponds to time, and the vertical axis corresponds to the signal level (e.g., amplitude) of a signal transmitted and received by the object detection device 100 via the transducer 111 (the vibrator 111a).

In the graph illustrated in FIG. 3, the solid line L11 indicates an example of an envelope representing temporal change in the signal level of a signal transmitted and received by the object detection device 100, i.e., in the degree of vibration of the vibrator 111a. It can be read from the solid line L11 that the vibrator 111a is driven to vibrate during only a time T1 from a timing t0, that the transmission of a transmission signal is completed at a timing t1, and that thereafter, the vibration of the vibrator 111a continues while being attenuated due to inertia during a time T2 until a timing t2. Thus, in the graph illustrated in FIG. 3, the time T2 corresponds to so-called reverberation time.

The solid line L11 indicates that the degree of vibration of the vibrator 111a reaches a peak beyond (or equal to or greater than) a predetermined threshold value Th1 represented by the one-dot dashed line L21 at a timing t4 at which only a time Tp has elapsed from the timing t0 at which the transmission of the transmission signal is started. The threshold value Th1 is an example of the first threshold value and is a value that is preset in order to identify whether the vibration of the vibrator 111a is caused by the reception of a reception signal as the transmission signal reflected and returned by a detection target object (e.g., the obstacle X1 illustrated in FIG. 2) or whether the vibration of the vibrator 111a is caused by the reception of a reception signal as the transmission signal reflected and returned by an object (e.g., the road surface X2 illustrated in FIG. 2) other than the detection target object. In addition, although FIG. 3 illustrates an example in which the threshold value Th1 is set to a fixed value that does not change with the elapse of time, in the first embodiment, the threshold value Th1 may be set to a value that changes with the elapse of time.

For example, vibration having a peak beyond (or equal to or greater than) the threshold value Th1 may be determined as being caused by the reception of the reception signal as the transmission signal reflected and returned by the detection target object, and vibration having a peak equal to or less than (or below) the threshold value Th1 may be determined as being caused by the reception of the reception signal as the transmission signal reflected and returned by the object other than the detection target object. Thus, it can be read from the solid line L11 that the vibration of the vibrator 111a at the timing t4 has been caused by the reception of the reception signal as the transmission signal reflected and returned by the detection target object.

In addition, in the solid line L11, the vibration of the vibrator 111a is attenuated after the timing t4. Thus, the timing t4 corresponds to the timing at which the reception of the reception signal as the transmission signal reflected and returned by the detection target object is completed, in other words, the timing at which the transmission signal transmitted last at the timing t1 is returned as the reception signal. In addition, in the solid line L11, a timing t3 as the start point of the peak at the timing t4 corresponds to the timing at which the reception of the reception signal as the transmission signal reflected and returned by the detection target object is started, in other words, the timing at which the transmission signal transmitted initially at the timing t0 is returned as the reception signal. Thus, in the solid line L11, a time ΔT between the timing t3 and the timing t4 is equal to the time T1 as the transmission time of the transmission signal.

Here, in order to obtain the distance to the detection target object by a TOF method, it is necessary to obtain a time Tf between the timing t0 at which the transmission signal starts to be transmitted and the timing t3 at which the reception signal starts to be received. The time Tf may be obtained by subtracting the time ΔT equal to the time T1 as the transmission time of the transmission signal from the time Tp as a difference between the timing t0 and the timing t4 at which the signal level of the reception signal reaches the peak beyond the threshold value Th1. Since the timing t0 may be easily specified as the timing at which the object detection device 100 starts an operation and the time T1 is preset by setting, for example, it is important to specify the timing t4 in order to obtain the distance to the detection target object by the TOF method.

Accordingly, in the first embodiment, as described above, predetermined encoding is performed on the transmission signal so that identification information of a predetermined code length is imparted to the transmission signal and the reception signal. Then, in the first embodiment, the correlation value corresponding to the degree of similarity between the identification information of the transmission signal and the identification information of the reception signal is acquired, and it is determined whether or not the degree of similarity is a predetermined level or higher based on the result of comparison between the correlation value and the first threshold value. In addition, the first threshold value as a comparison target of the correlation value is a value corresponding to the above threshold value Th1. According to this configuration, since the timing at which it is determined that the degree of similarity is a predetermined level or higher may be specified as the timing t4 at which the reception signal reaches a peak beyond the threshold value Th1, it is possible to obtain the distance to the detection target object by the TOF method.

By the way, there is considered a case where the transmission signal is returned as the reception signal before the reverberation time is over since the detection target object exists at a short distance. In this case, in the graph illustrated in FIG. 3, a waveform represented by an envelope like the broken line L12 appears during the time T2 (reverberation time) between the timing t1 and the timing t2.

Since the transmission signal returned during the reverberation time propagates only at a short distance and is attenuated at a low degree, the vibrator 111a undergoes vibration (see the broken line L12) greater than the residual vibration due to inertia (see the solid line L11). Thus, in the first embodiment, it may be determined whether the transmission signal has been reflected and returned as the reception signal by the detection target object using the same method as that after the timing t2 described above even during a time from immediately after the timing t1 at which the transmission of the transmission signal is completed to the timing t2 at which the reverberation time is over.

However, the signal level of the reception signal as a detection target during the time from immediately after the timing t1 until the timing t2 and the signal level of the reception signal as a detection target after the timing t2 differ from each other. Thus, it is necessary to use a threshold value Th2 (see the two-dot dashed line L22) as an example of a first-first threshold value that is used during the time from immediately after the timing t1 until the timing t2 and the threshold value Th1 (see the one-dot dashed line L21) as an example of a second-first threshold value separately according to time.

In addition, since the transmission signal is attenuated as the distance of propagation increases, the signal level of the reception signal decreases as the timing at which the transmission signal is returned as the reception signal is delayed. Thus, in the first embodiment, in order to accurately detect the reception signal having a signal level which decreases with the elapse of time, the above threshold value Th2 is set so as to decrease with the elapse of time. In addition, although FIG. 3 illustrates an example in which the one-dot dashed line L21 representing the threshold value Th1 and the two-dot dashed line L22 representing the threshold value Th2 continue at the timing t2 at which the reverberation time is over, in the first embodiment, the threshold value Th1 and the threshold value Th2 may not be set continuously.

In this way, in the first embodiment, the correlation value corresponding to the degree of similarity between the identification information of the transmission signal and the identification information of the reception signal is acquired not only after the reverberation time is over but also during the time from immediately after the transmission of the transmission signal is completed until the reverberation time is over, and it is determined whether or not the degree of similarity is a predetermined level or higher based on the result of comparison between the correlation value and the threshold value.

However, in the first embodiment, the first-first threshold value as the first threshold value to be compared with the correlation value after the reverberation time is over and the second-first threshold value as the first threshold value to be compared with the correlation value during the time from immediately after the transmission of the transmission signal is completed until the reverberation time is over are made different. The first-first threshold value is a value corresponding to the above threshold value Th1. In addition, the second-first threshold value is a value corresponding to the above threshold value Th2 and is set so as to decrease with the elapse of time. In addition, in the first embodiment, it is assumed that the object detection device 100 (e.g., the correlation processing unit 123) itself performs switching between the first-first threshold value and the second-first threshold value. In this case, both the first-first threshold value and the second-first threshold value are stored in the storage unit 121.

In addition, when the determination of the degree of similarity is performed based on all of the identification information, i.e., all bit strings as the identification information, the reliability of the result of the determination increases, but it may take time to calculate. Therefore, for example, when the reverberation time is short, the determination of the degree of similarity may not be performed based on all of the identification information. Thus, in the first embodiment, the determination of the degree of similarity may be performed based on a part of the identification information, for example, only a few bits located at the head of a bit string as the identification information at least during the time from immediately after the transmission of the transmission signal is completed until the reverberation time is over. That is, in the first embodiment, the correlation value corresponding to the degree of similarity between at least a part of the identification information of the transmission signal and at least a part of the identification information of the reception signal may be acquired during the reverberation time from immediately after the transmission of the transmission signal is completed until the vibration of the vibrator 111a due to inertia subsides is over, and it may be determined whether or not the degree of similarity is a predetermined level or higher based on the result of comparison between the correlation value and the threshold value (the second-first threshold value).

Figure 4:
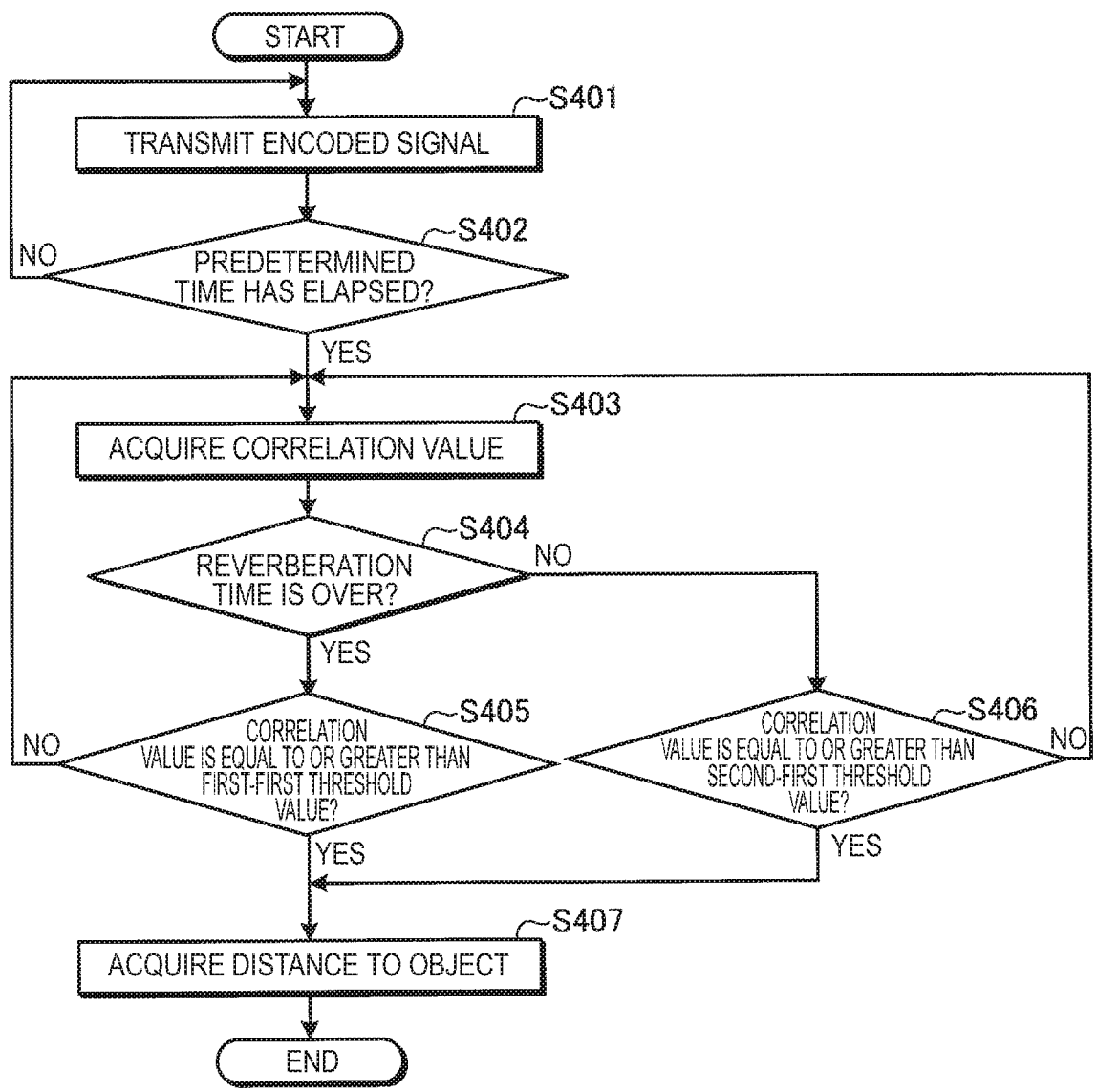
FIG. 4 is an exemplary and schematic flowchart illustrating a series of processings executed by the object detection device according to the first embodiment for detecting an object.

FIG. 4 is an exemplary and schematic flowchart illustrating a series of processings executed by the object detection device 100 according to the first embodiment for detecting an object.

In the processing flow illustrated in FIG. 4, first, in S401, the object detection device 100 (e.g., the encoding processing unit 122, the transducer 111, the oscillator 112, and the modulator 113) transmits an encoded signal as a transmission signal.

Then, in S402, the object detection device 100 (e.g., the controller 120) determines whether or not a predetermined time that is set as the transmission time of the transmission signal has elapsed.

In S402, when it is determined that the predetermined time has not yet elapsed, the processing returns to S401. On the other hand, when it is determined in S402 that the predetermined time has elapsed, the processing proceeds to S403.

In S403, the object detection device 100 (e.g., the correlation processing unit 123) acquires a correlation value corresponding to the degree of similarity between identification information of the transmission signal and identification information of a reception signal. That is, the object detection device 100 acquires the correlation value from immediately after the transmission of the transmission signal is completed.

Then, in S404, the object detection device 100 (e.g., the correlation processing unit 123) determines whether or not the reverberation time has been over. This determination may be performed based on the reverberation time that is preset according to, for example, the specification of the vibrator 111a, or may be performed by monitoring actual vibration of the vibrator 111a and detecting whether or not the vibration subsides.

When it is determined in S404 that the reverberation time has been over, the processing proceeds to S405. Then, in S405, the object detection device 100 (e.g., the correlation processing unit 123) determines whether or not the correlation value acquired in S403 is equal to or greater than a first-first threshold value that is set as a comparison target of the correlation value after the reverberation time is over.

In S405, when it is determined that the correlation value is less than the first-first threshold value, it may be determined that the identification information of the transmission signal and the identification information of the reception signal are not similar to (coincident with) each other at a predetermined level or higher, that is, the transmission signal has not been yet returned as a reception signal by reflection. Thus, in this case, the processing returns to S403 and the correlation value is again acquired.

On the other hand, when it is determined in S404 that the reverberation time has not been yet over, the processing proceeds to S406. Then, in S406, the object detection device 100 (e.g., the correlation processing unit 123) determines whether or not the correlation value acquired in S403 is equal to or greater than a second-first threshold value that is set as a comparison target of the correlation value during the reverberation time.

When it is determined in S406 that the correlation value is less than the second-first threshold value, it may be determined that the identification information of the transmission signal and the identification information of the reception signal are not similar to (coincident with) each other at the predetermined level or higher, that is, the transmission signal has not been yet returned as the reception signal by reflection. Thus, in this case, the processing returns to S403 and the correlation value is again acquired.

Here, when it is determined in S405 that the correlation value is equal to or greater the first-first threshold value and when it is determined in S406 that the correlation value is equal to or greater than the second-first threshold value, it may be determined that the identification information of the transmission signal and the identification information of the reception signal are similar to (coincident with) each other at the predetermined level or higher, that is, the transmission signal has been returned as the reception signal by reflection. Thus, in this case, the processing proceeds to the next S407.

In S407, the object detection device 100 (e.g., the distance measurement unit 124) acquires (calculates) the distance to the object that has reflected the transmission signal by the TOF method based on a difference between the timing at which the transmission signal is transmitted (more specifically, starts to be transmitted) and the timing at which the reception signal is received as the transmission signal returned by reflection (more specifically, starts to be received). Then, the processing ends.

As described above, the object detection device 100 according to the first embodiment includes the transceiver 110, the correlation processing unit 123, and the distance measurement unit 124 configured as follows. The transceiver 110 includes the vibrator 111a capable of transmitting and receiving ultrasonic waves, and transmits a transmission signal on which encoding has been performed to impart identification information of a predetermined code length and receives the transmission signal reflected by an object as a reception signal via the vibrator 111a. The correlation processing unit 123 acquires a correlation value corresponding to the degree of similarity between the identification information of the transmission signal and the identification information of the reception signal from immediately after the transmission of the transmission signal is completed, and determines whether or not the degree of similarity is equal to or greater than a predetermined level corresponding to a threshold value based on the result of comparison between the correlation value and a first threshold value (the above first-first threshold value or the above second-first threshold value). The distance measurement unit 124 detects information about the object (the distance to the object) when it is determined that the degree of similarity is the predetermined level or higher.

According to the above-described configuration, it may be determined, using the identification information imparted to the transmission signal (and the reception signal), whether the transmission signal has been reflected and received as the reception signal from immediately after the transmission of the transmission signal is completed. Thus, since the reception signal may be detected even before the reverberation time is over, it is possible to realize detection of an object existing at a shorter distance.

Moreover, the above-described configuration is effective when a plurality of object detection devices 100 are provided. For example, in the configuration in which the plurality of object detection devices 101 to 104 are provided as illustrated in FIG. 1, when identification information of the object detection devices 101 to 104 is made different, it is possible to prevent one object detection device 100 from erroneously detecting a reception signal when a transmission signal transmitted by another object detection device is returned as the reception signal. That is, in the first embodiment, the object detection devices 101 to 104 may simultaneously detect information about objects using different pieces of identification information. According to this configuration, since the circumstance around the vehicle 1 may be quickly and precisely detected based on a plurality of detection results acquired at the same time, it is possible to realize quick and accurate parking assistance.

<Modification>

In addition, in the above description, the technology of the first embodiment is applied to a configuration in which information about an object is detected by the transmission and reception of ultrasonic waves, but the technology of the first embodiment may also be applied to a configuration in which information about an object is detected by the transmission and reception of sound waves, millimeter waves, or electromagnetic waves, for example, as waves other than ultrasonic waves.

In addition, the first embodiment described above illustrates a configuration in which the object detection device 100 itself controls an operation such as switching of the modulation method of the transmission signal or switching between the first-first threshold value and the second-first threshold value. However, these operations may be realized under the control from the outside as in a modification to be described below.

Figure 5:
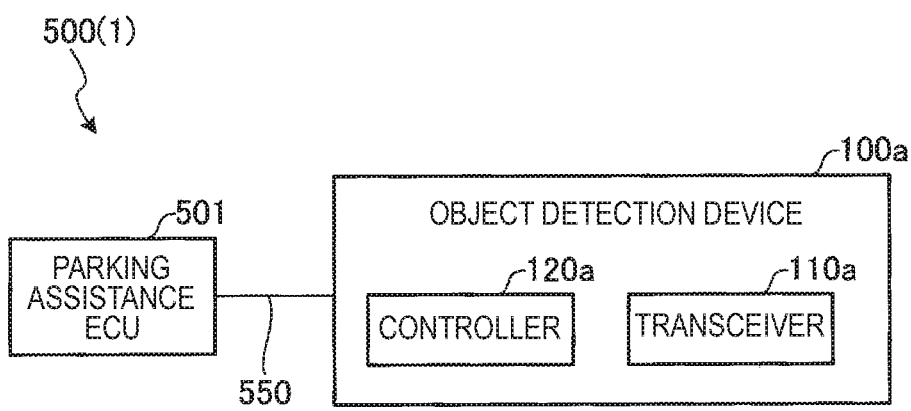
FIG. 5 is an exemplary and schematic block diagram illustrating a configuration of a parking assistance apparatus including an object detection device according to a modification of the first embodiment.

FIG. 5 is an exemplary and schematic block diagram illustrating a configuration of a parking assistance apparatus 500 including an object detection device 100a according to a modification of the first embodiment. As illustrated in FIG. 5, the parking assistance apparatus 500 includes the object detection device 100a and a parking assistance electronic control unit (ECU) 501.

The object detection device 100a is a sensing device that detects information about an object existing on the periphery such as the object detection device 100 according to the first embodiment described above. In addition, the parking assistance ECU 501 is a microcomputer as a parking assistance controller that realizes parking assistance (including automatic parking). The object detection device 100a and the parking assistance ECU 501 are connected to each other via a communication path 550 using local interconnect network (LIN) or universal asynchronous receiver/transmitter (UART).

In the modification, the basic hardware configurations and functions of a transducer 110a and a controller 120a included in the object detection device 100a are substantially the same as in the first embodiment described above. However, the modification differs from the first embodiment described above in that the operation performed in the object detection device 100a such as switching of the modulation method of the transmission signal or switching between the first-first threshold value and the second-first threshold value is realized under the control of the parking assistance ECU 501. With this configuration, it is possible to simplify the function of the object detection device 100a.

Second Embodiment

In the first embodiment described above, information about the object is detected based on (the peak of) the correlation value obtained as the result of one correlation processing. However, as illustrated in the following FIG. 6, for example, it is assumed that it is difficult to accurately detect information about the object by merely considering the correlation value obtained as the result of one correlation processing.

Figure 6:
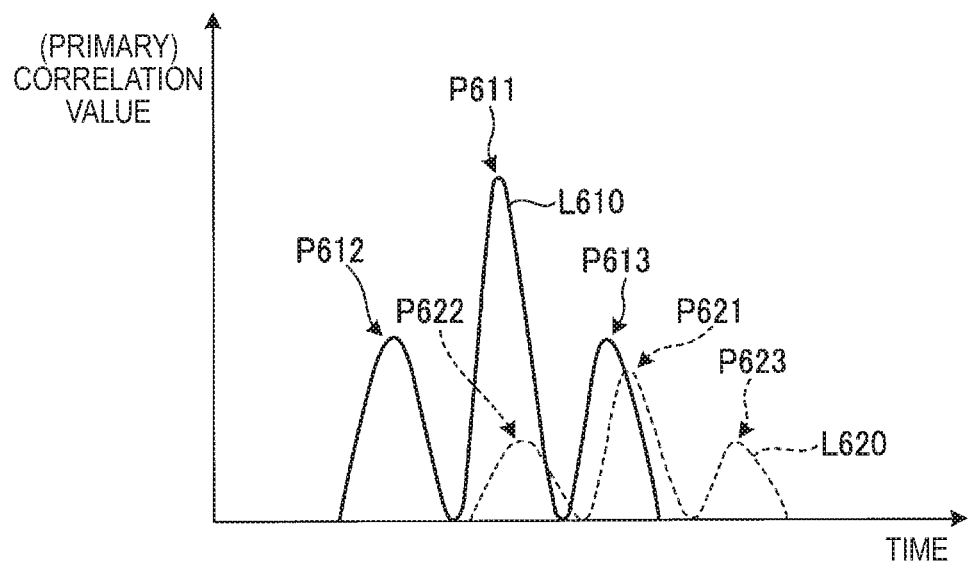
FIG. 6 is an exemplary and schematic view diagram for explaining the necessity of the second embodiment.

FIG. 6 is an exemplary and schematic diagram for explaining the necessity of the second embodiment. In an example illustrated in FIG. 6, the solid line L610 is an envelope representing a pattern of temporal change in the correlation value based on a transmission signal returned at a strong level in response to, for example, reflection from a hard object or reflection from an object at a short distance, and the broken line L620 is an envelope representing a pattern of temporal change in the correlation value based on a transmission signal returned at a weak level in response to, for example, reflection from a soft object or reflection from an object at a long distance.

In general, the envelope representing the pattern of temporal change in the correlation value is known as having a first peak that is called a main lobe and a second peak that is called a side lobe, the second peak being adjacent to the first peak and being smaller than the first peak. Thus, in the example illustrated in FIG. 6, the solid line L610 has a first peak P611 and second peaks P612 and P613 at both sides of the first peak P611, and the broken line L620 has a first peak P621 and second peaks P622 and P623 at both sides of the first peak P621.

In addition, in the example illustrated in FIG. 6, for simplicity, the side lobes exist one at each side of the main lobe and the levels (sizes) of the two side lobes substantially coincide with each other, but, in practice, there is a possibility of the side lobes existing two or more at each side and there is a possibility of the respective side lobes having various different levels.

In addition, in the example illustrated in FIG. 6, for the convenience of explanation, the patterns of temporal change in two types of correlation values depending on reflections in two types of different modes are indicated separately by the solid line L610 corresponding to the reflection in a first mode and the broken line L620 corresponding to the reflection in a second mode. However, since the modes of reflection generally may not be distinguished in advance, the pattern of temporal change in the correlation value actually obtained in the correlation processing is a combined pattern of the solid line L610 and the broken line L620.

Here, in the correlation value obtained by the technology of the first embodiment described above, the first peak called the main lobe may be compared with the threshold value (first threshold value). However, in the example illustrated in FIG. 6, since the first peak P621 of the broken line L620 corresponding to the reflection in the second mode partially overlaps the second peak P613 of the solid line L610 corresponding to the reflection in the first mode as viewed in time series, it is difficult to accurately extract only the first peak P621 of the broken line L620 from the combined pattern. That is, in the example illustrated in FIG. 6, it is difficult to accurately detect information about the object that causes the reflection in the second mode.

Thus, the object detection device 1100 (see FIG. 2) according to the second embodiment realizes accurate detection of information about each object that causes reflection in each mode even in a situation where temporal changes in a plurality of (e.g., two) correlation values depending on reflections in a plurality of (e.g., two) different modes appear in a partially overlapped form, as in the example illustrated in FIG. 6 based on the configuration and processing as described below.

In addition, a configuration of the object detection device 1100 according to the second embodiment is substantially the same as that of the object detection device 100 according to the first embodiment described above (see FIG. 2). However, in the second embodiment, the functions of a correlation processing unit 1123 and a distance measurement unit 1124 of a controller 1200 differ from those of the first embodiment described above.

More specifically, in the second embodiment, the correlation processing unit 1123 first acquires a first correlation value corresponding to the degree of similarity between the identification information of the transmission signal and the identification information of the reception signal by the correlation processing as in the first embodiment described above. For example, in the example illustrated in FIG. 6, the combined pattern of the solid line L610 and the broken line L620 corresponds to temporal change in the first correlation value. In addition, in the following description, the first correlation value may be referred to as a primary correlation value, and the correlation processing for acquiring the primary correlation value may be referred to as a primary correlation processing. The primary correlation processing may be acquired based on a generally well-known correlation function and the like.

Then, in the second embodiment, the correlation processing unit 1123 acquires a second correlation value corresponding to the degree of similarity between a first pattern corresponding to temporal change in the first correlation value and at least a portion of a preset second pattern as a reference pattern. The reference pattern is information as illustrated in the following FIG. 7 which is acquired by estimating a relationship between a main lobe and a side lobe of temporal change in the primary correlation value in advance. In addition, in the following description, the second correlation value may be referred to as a secondary correlation value, and a correlation processing for acquiring the secondary correlation value may be referred to as a secondary correlation processing. The secondary correlation processing may also be acquired based on a generally well-known correlation function, for example, as in the primary correlation processing.

Figure 7:
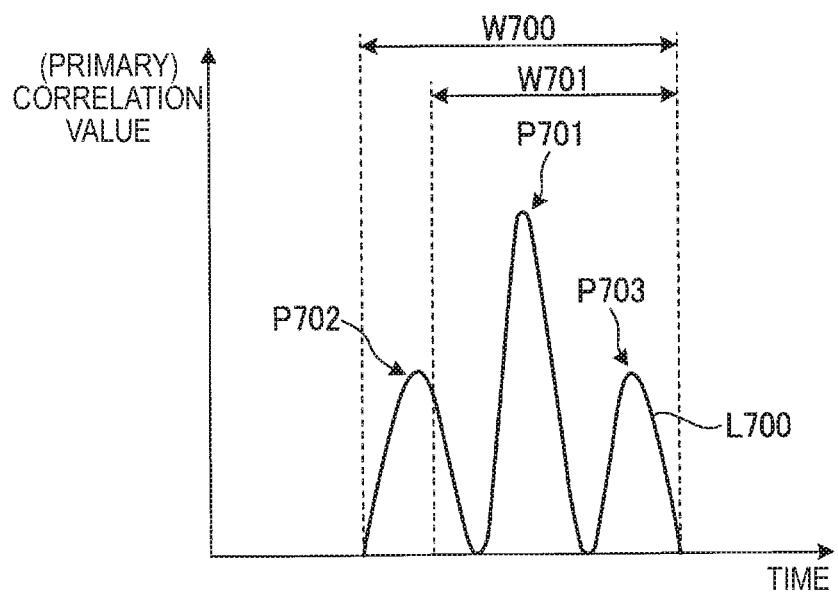
FIG. 7 is an exemplary and schematic diagram illustrating a reference pattern according to the second embodiment.

FIG. 7 is an exemplary and schematic diagram illustrating an example of a reference pattern according to the second embodiment. In an example illustrated in FIG. 7, the solid line L700 corresponds to the reference pattern.

As illustrated in FIG. 7, the reference pattern indicated by the solid line L700 includes a first peak P701 and a second peak P702 which is adjacent to the first peak P701 and is smaller than the first peak P701 in a manner similar to the pattern of each of the solid line L610 and the broken line L620 illustrated in FIG. 6.

Thus, when the (secondary) correlation processing is executed on the reference pattern indicated by the solid line L700 and the combined pattern of the solid line L610 and the broken line L620 illustrated in FIG. 6, it is possible to acquire, based on the degree of similarity between the two, information about the pattern indicated by the solid line L610 and information about the pattern indicated by the broken line L620, which are separated from each other at a certain level, from the combined pattern of the solid line L610 and the broken line L620. That is, according to the secondary correlation processing, it is possible to acquire, from information (the above primary correlation value) in which pieces of information about reflections in a plurality of modes coexist in a state where they are indistinguishable from each other, information separated at a certain level for each mode as illustrated in the following FIG. 8.

Figure 8:
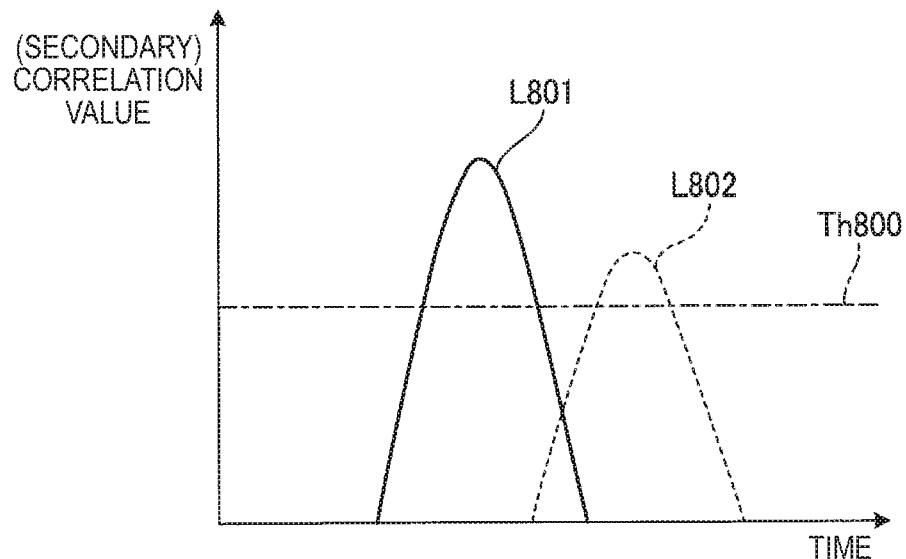
FIG. 8 is an exemplary and schematic diagram illustrating the result of a secondary correlation processing according to the second embodiment.

FIG. 8 is an exemplary and schematic diagram illustrating the result of a secondary correlation processing according to the second embodiment. In an example illustrated in FIG. 8, the solid line L801 corresponds to a pattern of temporal change in the secondary correlation value that appears as the result of the secondary correlation processing performed on the solid line L610 illustrated in FIG. 6 and the solid line L700 illustrated in FIG. 7, and the broken line L802 corresponds to a pattern of temporal change in a secondary correlation value that appears as the result of the secondary correlation processing performed on the broken line L620 illustrated in FIG. 6 and the solid line L700 illustrated in FIG. 7.

In addition, in the example illustrated in FIG. 8, for the convenience of explanation, the pattern of temporal change in the secondary correlation value is divided and illustrated by the solid line L801 and the broken line L802. However, similarly to the relationship between the solid line L610 and the broken line L602 illustrated in FIG. 6, the pattern of temporal change in the secondary correlation value actually obtained in the secondary correlation processing is a combined pattern of the solid line L801 and the broken line L802.

However, the pattern of temporal change in the secondary correlation value actually obtained in the secondary correlation processing is a form in which a plurality of (e.g., two) patterns having peaks at different positions in time series are separated from each other at a certain level. For example, in the example illustrated in FIG. 8, the pattern of temporal change in the secondary correlation value is divided at a certain level into the pattern indicated by the solid line L801 and the pattern indicated by the broken line L802.

Here, the pattern indicated by the solid line L801 is a pattern that appears due to the fact that the solid line L610 illustrated in FIG. 6 and the solid line L700 illustrated in FIG. 7 are similar to each other, and the pattern indicated by the broken line L802 is a pattern that appears due to the fact that the broken line L620 illustrated in FIG. 6 and the solid line L700 illustrated in FIG. 7 are similar to each other. Since the pattern indicated by the solid line L801 and the pattern indicated by the broken line L802 reach peaks at different positions in time series, it is possible to detect reflections in two different modes from the secondary correlation value illustrated in FIG. 8.

As described above, according to the secondary correlation processing, it is possible to acquire pieces of information about reflections in a plurality of modes which are separated at a certain level for each reflection mode. Thus, when setting an appropriate threshold value Th800 and comparing the threshold value Th800 with the secondary correlation value, it is possible to appropriately detect information about reflection in each mode at once. In addition, the threshold value Th800 is an example of a "second threshold value".

For example, in the example illustrated in FIG. 8, it is possible to detect two patterns including the pattern indicated by the solid line L801 and the pattern indicated by the broken line L802 as a pattern having a peak at a level equal to or greater than the threshold value Th800. Thus, according to the example illustrated in FIG. 8, it is possible to detect a transmission signal which is reflected in two different modes and is returned as two types of different reception signals.

Then, considering a timing at which the transmission signal is transmitted and a timing at which each of the two types of different reception signals is received, it is possible to detect information about each of objects that cause reflections in the above two types of modes. That is, it is possible to detect the distance to the object that causes the reflection in a first mode when considering a difference between the timing at which the transmission signal is transmitted and the timing at which a first reception signal is received, and it is possible to detect the distance to the object that causes the reflection in a second mode when considering a difference between the timing at which the transmission signal is transmitted and the timing at which a second reception signal is received.

As described above, according to the second embodiment, even in a situation where temporal changes in a plurality of primary correlation values corresponding to reflections in a plurality of different modes appear in a partially overlapped manner, it is possible to accurately detect information about each object that causes the reflection in each mode based on the secondary correlation value.

That is, in the second embodiment, the correlation processing unit 1123 acquires, after acquiring the primary correlation value, the secondary correlation value corresponding to the degree of similarity between the first pattern corresponding to temporal change in the primary correlation value and at least a portion of the second pattern that is preset as the reference pattern. Then, the distance measurement unit 1124 detects information about the object (the distance to the object) based on the result of comparison between the secondary correlation value and the second threshold value.

More specifically, the correlation processing unit 1123 acquires the secondary correlation value after acquiring the primary correlation value, and based on the result of comparison between the secondary correlation value and the second threshold value, determines whether or not a plurality of signals have been received as a reception signal to which the identification information having a predetermined level or higher degree of similarity with the identification information of the transmission signal is imparted. Then, when it is determined that the plurality of signals are received, the distance measurement unit 1124 detects information about a plurality of objects (the distances to each of the plurality of objects) which respectively provide reflections of a plurality of signals as information about the object.

By the way, as described above, paying attention to the vibrator 111*a* from immediately after the transmission of the transmission signal is completed (e.g., immediately after the timing t1 in FIG. 3) until the reverberation time is over, it is easy to detect vibration (see the broken line L12) greater than the residual vibration due to inertia (see the solid line L11), but it is difficult to detect vibration smaller than the residual vibration due to inertia (see the solid line L11). Thus, since it is not always possible to accurately detect all temporal changes in the signal level of the reception signal in the reverberation time, the primary correlation value in the reverberation time may not be said that it includes all of a main lobe and a side lobe as usual (i.e., in a manner similar to the entire reference pattern).

Thus, in the second embodiment, the correlation processing unit 1123 changes the section of the reference pattern used for the acquisition of the secondary correlation value according to the elapsed time after the transmission of the transmission signal is completed. For example, when the elapsed time after the transmission of the transmission signal is completed is equal to or longer than the reverberation time, it is expected that the primary correlation value shows a pattern similar to the entire reference pattern since detection of entire temporal change in the signal level of the reception signal may be expected. On the other hand, when the elapsed time after the transmission of the transmission signal is completed is less than the reverberation time, it is expected that the primary correlation value shows a pattern similar to only a terminal side portion of the reference pattern in time series since detection of only the terminal side portion after the reverberation time is over among temporal change in the signal level of the reception signal may be expected. Thus, in the second embodiment, as illustrated in FIG. 7, in the former case, the correlation processing unit 1123 uses the entire section W700 of the reference pattern indicated by the solid line L700 to acquire the secondary correlation value, and in the latter case, the correlation processing unit 1123 uses the terminal side section W701 as a portion of the reference pattern indicated by the solid line L700 to acquire the secondary correlation value.

That is, in the second embodiment, the correlation processing unit 1123 uses the terminal side section of the reference pattern to acquire the secondary correlation value when the elapsed time after the transmission of the transmission signal is completed is shorter, and uses the entire reference pattern to acquire the secondary correlation value when the elapsed time is equal to or longer than a predetermined time. In addition, the predetermined time may be set so as to coincide with the reverberation time from immediately after the transmission of the transmission signal is completed until the vibration of the vibrator 111*a* due to inertia subsides. By setting in this manner, it is possible to acquire an appropriate secondary correlation value using an appropriate reference pattern according to the elapsed time after the transmission of the transmission signal is completed.

Figure 9:
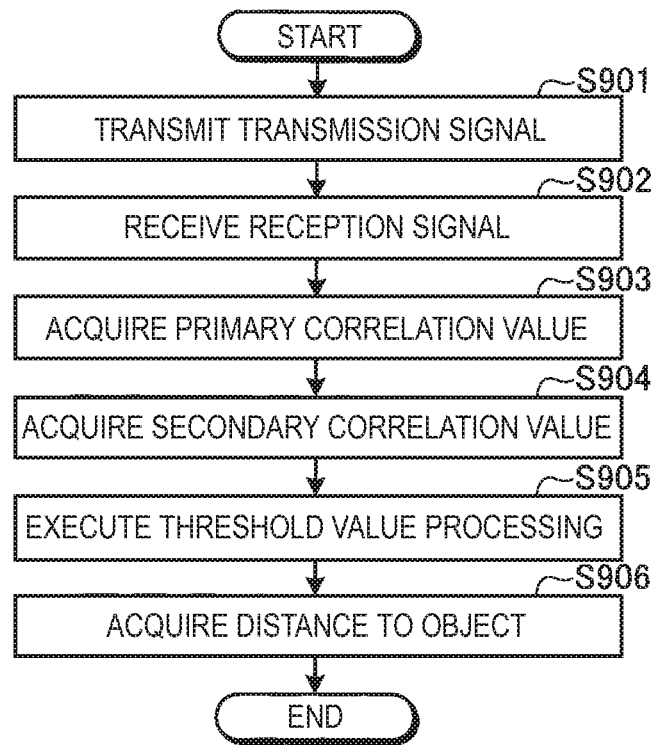
FIG. 9 is an exemplary and schematic flowchart illustrating a series of processings executed by the object detection device according to the second embodiment for detecting an object.

FIG. 9 is an exemplary and schematic flowchart illustrating a series of processings executed by the object detection device 1100 according to the second embodiment for detecting an object.

In a processing flow illustrated in FIG. 9, first, in S901, the object detection device 1100 (e.g., the transducer 111) transmits a transmission signal. This transmission signal is encoded to include identification information of a predetermined code length as in the first embodiment described above.

Then, in S902, the object detection device 1100 (e.g., the transducer 111) receives a reception signal. Since the reception signal is a transmission signal reflected and returned by an object, the reception signal may be encoded to include identification information of a predetermined code length in the same manner as the transmission signal.

Then, in S903, the object detection device 1100 (e.g., the correlation processing unit 1123) acquires a primary correlation value corresponding to the degree of similarity between the identification information of the transmission signal transmitted in S901 and the identification information of the reception signal received in S902.

Then, in S904, the object detection device 1100 (e.g., the correlation processing unit 1123) acquires a secondary correlation value corresponding to the degree of similarity between a pattern of temporal change in the primary correlation value acquired in S903 and a preset reference pattern.

Then, in S905, the object detection device 1100 (e.g., the correlation processing unit 1123) executes a threshold value processing of comparing the secondary correlation value acquired in S904 with a predetermined second threshold value described above. In this threshold value processing, based on the result of comparison between the secondary correlation value and the second threshold value, it is determined whether or not a plurality of signals have been received as a reception signal to which information about reflections in a plurality of modes, more specifically, information having a predetermined level or higher degree of similarity with the identification information of the transmission signal is imparted.

Then, in S906, the object detection device 1100 (e.g., the distance measurement unit 1124) acquires the distance to the object based on the result of the threshold value processing in S905. More specifically, when it is determined that the plurality of signals have been received in the threshold value processing in S905, the object detection device 1100 acquires information about a plurality of objects (the distances to each of the plurality of objects) which respectively provide reflections of a plurality of signals as information about the object. Then, the processing ends.

As described above, the object detection device 1100 according to the second embodiment includes the correlation processing unit 1123 and the distance measurement unit 1124. After the transmission of the transmission signal is completed, the correlation processing unit 1123 acquires the primary correlation value corresponding to the degree of similarity between the identification information of the transmission signal and the identification information of the reception signal, and acquires the secondary correlation value corresponding to the degree of similarity between the first pattern corresponding to temporal change in the primary correlation value and at least a portion of the reference pattern as the second pattern that is preset to include a first peak and a second peak which is adjacent to the first peak and is smaller than the first peak. The distance measurement unit 1124 detects information about the object (the distance to the object) based on the result of comparison between the secondary correlation value and the second threshold value.

More specifically, in the second embodiment, the correlation processing unit 1123 acquires, after acquiring the primary correlation value, the secondary correlation value (see FIG. 8) corresponding to the degree of similarity between the first pattern (see FIG. 6) corresponding to temporal change in the primary correlation value and at least a portion of the reference pattern (see FIG. 7) as the preset second pattern, and determines whether or not a plurality of signals have been received as the reception signal to which the identification information, the degree of similarity with the identification information of the transmission signal of which is equal to or greater than a predetermined level is imparted. Then, when it is determined that the plurality of signals have been received, the distance measurement unit 1124 detects information about a plurality of objects (the distances to each of the plurality of objects) which respectively provide reflections of a plurality of signals as information about the object.

According to the above configuration, by executing two correlation processings including the correlation processing of acquiring the first correlation value and the correlation processing of acquiring the second correlation value after the transmission of the transmission signal is completed, it is possible to realize detection of an object existing at a shorter distance and it is possible to accurately detect information about reflections in a plurality of modes.

Here, in the second embodiment, the correlation processing unit 1123 changes the section of the reference pattern used for the acquisition of the secondary correlation value according to the elapsed time after the transmission of the transmission signal is completed. According to such a configuration, it is possible to acquire an appropriate secondary correlation value using an appropriate section of the reference pattern according to the elapsed time after the transmission of the transmission signal is completed.

In addition, in the second embodiment, the correlation processing unit 1123 uses the terminal side section of the reference pattern to acquire the secondary correlation value when the elapsed time after the transmission of the transmission signal is completed is shorter, and uses the entire reference pattern to acquire the secondary correlation value when the elapsed time is equal to or longer than a predetermined time. According to such a configuration, it is possible to appropriately set the section of the reference pattern used for the acquisition of the secondary correlation value according to a relationship between the elapsed time after the transmission of the transmission signal is completed and the predetermined time.

In addition, in the second embodiment, the predetermined time is, for example, the reverberation time from immediately after the transmission of the transmission signal is completed until the vibration of the vibrator due to inertia subsides. According to such a configuration, it is possible to appropriately set the section of the reference pattern used for the acquisition of the secondary correlation value in consideration of the reverberation time.

Modification of Second Embodiment

Needless to say, the same modification as that of the first embodiment described above may be applied to the second embodiment. That is, the technology of the second embodiment may also be applied to a configuration that detects information about an object by the transmission and reception of sound waves, millimeter waves, electromagnetic waves, or the like. In addition, various processings in the second embodiment may be realized in such a manner that the object detection device executes the various processings under the control thereof, or that the object detection device executes the various processings under the control of a parking assistance controller connected thereto.

An object detection device according to an aspect of this disclosure includes a transducer having a vibrator capable of transmitting and receiving an ultrasonic wave and configured to transmit a transmission signal on which encoding has been performed to impart identification information of a predetermined code length and receive the transmission signal reflected by an object existing on a periphery as a reception signal by the vibrator, a correlation processing unit configured to acquire a first correlation value corresponding to a degree of similarity between the identification information of the transmission signal and the identification information of the reception signal from immediately after transmission of the transmission signal is completed and to determine, based on a result of comparison between the first correlation value and a first threshold value, whether or not the reception signal to which the identification information having a predetermined level or higher degree of similarity with the identification information of the transmission signal is imparted has been received, and a detection unit configured to detect information about the object when it is determined that the reception signal to which the identification information having the predetermined level or higher degree of similarity with the identification information of the transmission signal is imparted has been received.

According to the above configuration, it is possible to determine, using the identification information imparted to the transmission signal (and the reception signal), whether or not the transmission signal is reflected and is returned as the reception signal from immediately after the transmission of the transmission signal is completed. Thus, since the reception signal may be detected even before the reverberation time is over, it is possible to provide the object detection device capable of realizing detection of an object existing at a shorter distance.

In the above-described object detection device, the correlation processing unit may acquire the first correlation value corresponding to a degree of similarity between at least a part of the identification information of the transmission signal and at least a part of the identification information of the reception signal during a reverberation time from immediately after the transmission of the transmission signal is completed until vibration of the vibrator due to inertia subsides is over, and determine, based on a result of comparison between the first correlation value and the first threshold value, whether or not the reception signal to which the identification information having a predetermined level or higher degree of similarity with the identification information of the transmission signal is imparted has been received. With this configuration, since the time required to acquire (calculate) the first correlation value may be shortened unlike a case where information about all code lengths of the identification information is always considered, it is possible to realize quick detection of the object.

In the above-described object detection device, the correlation processing unit may set a first-first threshold value as the first threshold value to be compared with the first correlation value after the reverberation time from immediately after the transmission of the transmission signal is completed until the vibration of the vibrator due to inertia subsides is over and a second-first threshold value as the first threshold value to be compared with the first correlation value during the time from immediately after the transmission of the transmission signal is completed until the reverberation time is over so as to differ from each other. With this configuration, it is possible to realize appropriate detection of the object by separately using different first threshold values according to situations.

In the above-described object detection device, the second-first threshold value may be set so as to be smaller with an elapse of time. With this configuration, it is possible to obtain the second-first threshold value suitable for the transmission signal (the reception signal) that is attenuated with the elapse of time (i.e., as the propagation distance increases).

In the above-described object detection device, the correlation processing unit may acquire, after acquiring the first correlation value, a second correlation value corresponding to a degree of similarity between a first pattern corresponding to temporal change in the first correlation value and at least a portion of a second pattern that is preset to include a first peak and a second peak that is adjacent to the first peak and is smaller than the first peak, and determine, based on a result of comparison between the second correlation value and a second threshold value, whether or not a plurality of signals have been received as the reception signal to which the identification information having the predetermined level or higher degree of similarity with the identification information of the transmission signal is imparted, and the detection unit may detect information about a plurality of objects that respectively provide reflections of the plurality of signals as information about the object when it is determined that the plurality of signals have been received. With this configuration, it is possible to accurately detect information about reflections in a plurality of modes by two correlation processings including a correlation processing of acquiring the first correlation value and a correlation processing of acquiring the second correlation value.

In this case, the correlation processing unit may change a section of the second pattern used for acquisition of the second correlation value according to an elapsed time after the transmission of the transmission signal is completed. With this configuration, it is possible to acquire an appropriate second correlation value using an appropriate section of the second pattern according to the elapsed time after the transmission of the transmission signal is completed.

In addition, in this case, the correlation processing unit may use a terminal side section of the second pattern for the acquisition of the second correlation value when the elapsed time after the transmission of the transmission signal is completed is shorter, and use the entire second pattern for the acquisition of the second correlation value when the elapsed time after the transmission of the transmission signal is completed is equal to or longer than a predetermined time. With this configuration, it is possible to appropriately set the section of the second pattern used for the acquisition of the second correlation value according to a relationship between the elapsed time after the transmission of the transmission signal is completed and the predetermined time.

Moreover, in this case, the predetermined time may be a reverberation time from immediately after the transmission of the transmission signal is completed until the vibration of the vibrator due to inertia subsides. With this configuration, it is possible to appropriately set the section of the second pattern used for the acquisition of the second correlation value in consideration of the reverberation time.

In the above-described object detection device, the detection unit may include a distance measurement unit configured to calculate a distance to the object as information about the object based on a difference between a timing at which the transmission signal is transmitted and a timing at which the reception signal is received. With this configuration, it is possible to obtain the distance to the object as a detection result.

An object detection device according to another aspect of this disclosure includes a transducer having a vibrator capable of transmitting and receiving an ultrasonic wave and configured to transmit a transmission signal on which encoding has been performed to impart identification information of a predetermined code length and receive the transmission signal reflected by an object existing on a periphery as a reception signal by the vibrator, a correlation processing unit configured to acquire a correlation value corresponding to a degree of similarity between the identification information of the transmission signal and the identification information of the reception signal during a reverberation time from immediately after transmission of the transmission signal is completed until vibration of the vibrator due to inertia subsides is over and to determine, based on a result of comparison between the correlation value and a threshold value, whether or not the reception signal to which the identification information having a predetermined level or higher degree of similarity with the identification information of the transmission signal is imparted has been received, and a detection unit configured to detect information about the object when it is determined that the reception signal to which the identification information having the predetermined level or higher degree of similarity with the identification information of the transmission signal is imparted has been received.

According to the above configuration, it is possible to determine, using the identification information imparted to the transmission signal (and the reception signal), whether or not the transmission signal is reflected and is returned as the reception signal during a reverberation time from after the transmission of the transmission signal is completed until vibration of the vibrator due to inertia subsides is over. Thus, since the reception signal may be detected even before the reverberation time is over, it is possible to provide the object detection device capable of realizing detection of an object existing at a shorter distance.

An object detection device according to another aspect of this disclosure includes a transducer having a vibrator capable of transmitting and receiving an ultrasonic wave and configured to transmit a transmission signal on which encoding has been performed to impart identification information of a predetermined code length and receive the transmission signal reflected by an object existing on a periphery as a reception signal by the vibrator, a correlation processing unit configured to acquire a first correlation value corresponding to a degree of similarity between the identification information of the transmission signal and the identification information of the reception signal after transmission of the transmission signal is completed and to acquire a second correlation value corresponding to a degree of similarity between a first pattern corresponding to temporal change in the first correlation value and at least a portion of a second pattern that is preset to include a first peak and a second peak that is adjacent to the first peak and is smaller than the first peak, and a detection unit configured to detect information about the object based on a result of comparison between the second correlation value and a threshold value.

According to the above configuration, it is possible to provide the object detection device capable of realizing detection of an object existing at a shorter distance by executing two correlation processings including a correlation processing of acquiring the first correlation value and a correlation processing of acquiring the second correlation value after the transmission of the transmission signal is completed.

A parking assistance apparatus according to another aspect of this disclosure includes an object detection device mounted in a vehicle and including a transducer having a vibrator capable of transmitting and receiving an ultrasonic wave and configured to transmit a transmission signal on which encoding has been performed to impart identification information of a predetermined code length and receive the transmission signal reflected by an object existing on a periphery as a reception signal by the vibrator, a correlation processing unit configured to acquire a first correlation value corresponding to a degree of similarity between the identification information of the transmission signal and the identification information of the reception signal from immediately after transmission of the transmission signal is completed and to determine, based on a result of comparison between the first correlation value and a threshold value, whether or not the reception signal to which the identification information having a predetermined level or higher degree of similarity with the identification information of the transmission signal is imparted has been received, and a detection unit configured to detect information about the object when it is determined that the reception signal to which the identification information having the predetermined level or higher degree of similarity with the identification information of the transmission signal is imparted has been received, and a parking assistance processing unit mounted in the vehicle to execute parking assistance of the vehicle based on the information about the object detected by the detection unit of the object detection device.

According to the above configuration, it is possible to determine, using the identification information imparted to the transmission signal (and the reception signal), whether or not the transmission signal is reflected and is returned as the reception signal from immediately after the transmission of the transmission signal is completed. Thus, since the reception signal may be detected even before the reverberation time is over, it is possible to provide the parking assistance apparatus capable of realizing detection of an object existing at a shorter distance.

In the above-described parking assistance apparatus, the object detection device may include a plurality of object detection devices, and the plurality of object detection devices may simultaneously detect the information about the object using different pieces of the identification information. With this configuration, since the circumstance around the vehicle may be quickly and precisely detected based on a plurality of detection results acquired at the same time, it is possible to realize quick and accurate parking assistance.

Although the embodiments and modifications disclosed here have been exemplified above, the above-described embodiments and modifications thereof are merely given by way of example, and are not intended to limit the scope of this disclosure. Such novel embodiments and modifications may be implemented in various other modes, and various omissions, substitutions, combinations, and changes thereof may be made without departing from the gist of this disclosure. In addition, the embodiments and modifications may be included in the scope and gist of this disclosure and are included in the disclosure described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
a transducer having a vibrator capable of transmitting and receiving an ultrasonic wave and configured to transmit a transmission signal on which encoding has been performed to impart identification information of a predetermined code length and receive the transmission signal reflected by an object existing on a periphery as a reception signal by the vibrator;
a correlation processing unit configured to acquire a first correlation value corresponding to a degree of similarity between the identification information of the transmission signal and the identification information of the reception signal from immediately after transmission of the transmission signal is completed and to determine, based on a result of comparison between the first correlation value and a first threshold value, whether or not the reception signal to which the identification information having a predetermined level or higher degree of similarity with the identification information of the transmission signal is imparted has been received; and
a detection unit configured to detect information about the object when it is determined that the reception signal to which the identification information having the predetermined level or higher degree of similarity with the identification information of the transmission signal is imparted has been received,
wherein the correlation processing unit acquires the first correlation value corresponding to a degree of similarity between at least a part of the identification information of the transmission signal and at least a part of the identification information of the reception signal during a reverberation time from immediately after the transmission of the transmission signal is completed until vibration of the vibrator due to inertia subsides is over, and determines, based on a result of comparison between the first correlation value and the first threshold value, whether or not the reception signal to which the identification information having a predetermined level or higher degree of similarity with the identification information of the transmission signal is imparted has been received.

2. The object detection device according to claim 1,
wherein the correlation processing unit sets a first-first threshold value as the first threshold value to be compared with the first correlation value after the reverberation time from immediately after the transmission of the transmission signal is completed until the vibration of the vibrator due to inertia subsides is over and a second-first threshold value as the first threshold value to be compared with the first correlation value during the time from immediately after the transmission of the transmission signal is completed until the reverberation time is over so as to differ from each other.

3. The object detection device according to claim 2,
wherein the second-first threshold value is set so as to be smaller with an elapse of time.

4. The object detection device according to claim 2,
wherein the correlation processing unit acquires, after acquiring the first correlation value, a second correlation value corresponding to a degree of similarity between a first pattern corresponding to temporal change in the first correlation value and at least a portion of a second pattern that is preset to include a first peak and a second peak that is adjacent to the first peak and is smaller than the first peak, and determines, based on a result of comparison between the second correlation value and a second threshold value, whether or not a plurality of signals have been received as the reception signal to which the identification information having the predetermined level or higher degree of similarity with the identification information of the transmission signal is imparted, and
the detection unit detects information about a plurality of objects that respectively provide reflections of the plurality of signals as information about the object when it is determined that the plurality of signals have been received.

5. The object detection device according to claim 3,
wherein the correlation processing unit acquires, after acquiring the first correlation value, a second correlation value corresponding to a degree of similarity between a first pattern corresponding to temporal change in the first correlation value and at least a portion of a second pattern that is preset to include a first peak and a second peak that is adjacent to the first peak and is smaller than the first peak, and determines, based on a result of comparison between the second correlation value and a second threshold value, whether or not a plurality of signals have been received as the reception signal to which the identification information having the predetermined level or higher degree of similarity with the identification information of the transmission signal is imparted, and
the detection unit detects information about a plurality of objects that respectively provide reflections of the plurality of signals as information about the object when it is determined that the plurality of signals have been received.

6. The object detection device according to claim 1,
wherein the correlation processing unit acquires, after acquiring the first correlation value, a second correlation value corresponding to a degree of similarity between a first pattern corresponding to temporal change in the first correlation value and at least a portion of a second pattern that is preset to include a first peak and a second peak that is adjacent to the first peak and is smaller than the first peak, and determines, based on a result of comparison between the second correlation value and a second threshold value, whether or not a plurality of signals have been received as the reception signal to which the identification information having the predetermined level or higher degree of similarity with the identification information of the transmission signal is imparted, and
the detection unit detects information about a plurality of objects that respectively provide reflections of the plurality of signals as information about the object when it is determined that the plurality of signals have been received.

7. The object detection device according to claim 6,
wherein the correlation processing unit changes a section of the second pattern used for acquisition of the second correlation value according to an elapsed time after the transmission of the transmission signal is completed.

8. The object detection device according to claim 7,
wherein the correlation processing unit uses a terminal side section of the second pattern for the acquisition of the second correlation value when the elapsed time after the transmission of the transmission signal is completed is shorter, and uses the entire second pattern for the acquisition of the second correlation value when the elapsed time after the transmission of the transmission signal is completed is equal to or longer than a predetermined time.

9. The object detection device according to claim 8,
wherein the predetermined time is a reverberation time from immediately after the transmission of the transmission signal is completed until the vibration of the vibrator due to inertia subsides.

10. The object detection device according to claim 1,
wherein the detection unit includes a distance measurement unit configured to calculate a distance to the object as information about the object based on a difference between a timing at which the transmission signal is transmitted and a timing at which the reception signal is received.

11. The object detection device according to claim 1,
wherein the correlation processing unit sets a first-first threshold value as the first threshold value to be compared with the first correlation value after the reverberation time from immediately after the transmission of the transmission signal is completed until the vibration of the vibrator due to inertia subsides is over and a second-first threshold value as the first threshold value to be compared with the first correlation value during the time from immediately after the transmission of the transmission signal is completed until the reverberation time is over so as to differ from each other.

12. The object detection device according to claim 1,
wherein the correlation processing unit acquires, after acquiring the first correlation value, a second correlation value corresponding to a degree of similarity between a first pattern corresponding to temporal change in the first correlation value and at least a portion of a second pattern that is preset to include a first peak and a second peak that is adjacent to the first peak and is smaller than the first peak, and determines, based on a result of comparison between the second correlation value and a second threshold value, whether or not a plurality of signals have been received as the reception signal to which the identification information having the predetermined level or higher degree of similarity with the identification information of the transmission signal is imparted, and the detection unit detects information about a plurality of objects that respectively provide reflections of the plurality of signals as information about the object when it is determined that the plurality of signals have been received.

13. An object detection device comprising:

a transducer having a vibrator capable of transmitting and receiving an ultrasonic wave and configured to transmit a transmission signal on which encoding has been performed to impart identification information of a predetermined code length and receive the transmission signal reflected by an object existing on a periphery as a reception signal by the vibrator;

a correlation processing unit configured to acquire a first correlation value corresponding to a degree of similarity between the identification information of the transmission signal and the identification information of the reception signal after transmission of the transmission signal is completed and to acquire a second correlation value corresponding to a degree of similarity between a first pattern corresponding to temporal change in the first correlation value and at least a portion of a second pattern that is preset to include a first peak and a second peak that is adjacent to the first peak and is smaller than the first peak; and a detection unit configured to detect information about the object based on a result of comparison between the second correlation value and a threshold value, wherein the correlation processing unit acquires the first correlation value corresponding to a degree of similarity between at least a part of the identification information of the transmission signal and at least a part of the identification information of the reception signal during a reverberation time from immediately after the transmission of the transmission signal is completed until vibration of the vibrator due to inertia subsides is over, and determines, based on a result of comparison between the first correlation value and the first threshold value, whether or not the reception signal to which the identification information having a predetermined level or higher degree of similarity with the identification information of the transmission signal is imparted has been received.

14. A parking assistance apparatus comprising:

an object detection device mounted in a vehicle and including: a transducer having a vibrator capable of transmitting and receiving an ultrasonic wave and configured to transmit a transmission signal on which encoding has been performed to impart identification information of a predetermined code length and receive the transmission signal reflected by an object existing on a periphery as a reception signal by the vibrator;

a correlation processing unit configured to acquire a first correlation value corresponding to a degree of similarity between the identification information of the transmission signal and the identification information of the reception signal from immediately after transmission of the transmission signal is completed and to determine, based on a result of comparison between the first correlation value and a threshold value, whether or not the reception signal to which the identification information having a predetermined level or higher degree of similarity with the identification information of the transmission signal is imparted has been received; and a detection unit configured to detect information about the object when it is determined that the reception signal to which the identification information having the predetermined level or higher degree of similarity with the identification information of the transmission signal is imparted has been received; and a parking assistance processing unit mounted in the vehicle to execute parking assistance of the vehicle based on the information about the object detected by the detection unit of the object detection device, wherein the correlation processing unit acquires the first correlation value corresponding to a degree of similarity between at least a part of the identification information of the transmission signal and at least a part of the identification information of the reception signal during a reverberation time from immediately after the transmission of the transmission signal is completed until vibration of the vibrator due to inertia subsides is over, and determines, based on a result of comparison between the first correlation value and the first threshold value, whether or not the reception signal to which the identification information having a predetermined level or higher degree of similarity with the identification information of the transmission signal is imparted has been received.

15. The parking assistance apparatus according to claim 14, wherein the object detection device includes a plurality of object detection devices, and the plurality of object detection devices simultaneously detect the information about the object using different pieces of the identification information.

\* \* \* \* \*